(12) United States Patent
O'Toole (10) Patent No.: US 11,296,871 B2
(45) Date of Patent: Apr. 5, 2022

(54) SYSTEM AND METHOD FOR ENCRYPTION IN A CONTENT MANAGEMENT ENVIRONMENT

(71) Applicant: Open Text SA ULC, Halifax (CA)

(72) Inventor: Ryan Cathal Robert O'Toole, Kitchener (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 16/721,293

(22) Filed: Dec. 19, 2019

(65) Prior Publication Data

US 2020/0127819 A1  Apr. 23, 2020

Related U.S. Application Data

(63) Continuation of application No. 15/678,249, filed on Aug. 16, 2017, now Pat. No. 10,547,442.

(60) Provisional application No. 62/376,117, filed on Aug. 17, 2016.

(51) Int. Cl.
| | | |
|---|---|---|
| *H04L 29/06* | (2006.01) | |
| *H04L 9/08* | (2006.01) | |
| *H04L 9/16* | (2006.01) | |
| *G06F 21/62* | (2013.01) | |

(52) U.S. Cl.
CPC ........ *H04L 9/0822* (2013.01); *G06F 21/6263* (2013.01); *H04L 9/0863* (2013.01); *H04L 9/16* (2013.01); *H04L 2209/60* (2013.01)

(58) Field of Classification Search
CPC ....... H04L 9/0822; H04L 9/0863; H04L 9/16; H04L 63/0428; H04L 67/1095; H04L 2209/60; G06F 21/6263; G06F 21/6218; G06F 16/178; G06F 21/10; G06F 2221/2107

See application file for complete search history.

(56) References Cited

U.S. PATENT DOCUMENTS

| | | | |
|---|---|---|---|
| 8,199,911 B1 * | 6/2012 | Tsaur | G06F 16/1748 380/44 |
| 9,152,578 B1 * | 10/2015 | Saad | G06F 11/2023 |
| 9,779,269 B1 * | 10/2017 | Perlman | H04L 9/0822 |
| 10,547,442 B2 | 1/2020 | O'Toole | |
| 2015/0347782 A1 | 12/2015 | Sturonas et al. | |
| 2016/0315915 A1 | 10/2016 | Byszio | |
| 2017/0083709 A1 * | 3/2017 | Simmons | G06F 21/602 |
| 2018/0034792 A1 * | 2/2018 | Gupta | G06F 21/602 |
| 2018/0051303 A1 | 2/2018 | O'Toole | |

OTHER PUBLICATIONS

Office Action issued for U.S. Appl. No. 15/678,249, dated Jun. 25, 2019, 6 pages.
Notice of Allowance issued for U.S. Appl. No. 15/678,249, datec Sep. 19, 2019, 10 pages.

* cited by examiner

*Primary Examiner* — Yogesh Paliwal
(74) *Attorney, Agent, or Firm* — Sprinkle IP Law Group (57) ABSTRACT

Embodiments of content management systems that utilize encryption are disclosed. An object management module of a content management system is adapted to encrypt an object using a data key that is generated based on the content. The data key is encrypted using a tenant key associated with a tenant of the system. The encrypted object is stored in an object store, and a storage record for the stored encrypted object is stored in a data store, along with the encrypted data key and a tenant key identifier.

19 Claims, 7 Drawing Sheets

SYSTEM AND METHOD FOR ENCRYPTION IN A CONTENT MANAGEMENT ENVIRONMENT

RELATED APPLICATIONS

This application is a continuation of, and claims a benefit of priority under 35 U.S.C. 120 of the filing date of U.S. patent application Ser. No. 15/678,249 filed Aug. 16, 2017, entitled "System and Method for Encryption in a Content Management Environment", which claims the benefit of priority under 35 U.S.C. § 119(e) to U.S. Provisional Application No. 62/376,117, entitled "System and Method for Encryption in a Content Management Environment," filed Aug. 17, 2016, which is hereby fully incorporated by reference herein for all purposes.

TECHNICAL FIELD

This disclosure relates generally to securing content. In particular, this disclosure relates to securing content in a content management environment. Specifically, this disclosure relates to securing content in the context of the management of content with a content management system. Even more specifically, this disclosure relates to the encryption and decryption of content in a content management environment.

BACKGROUND

In computerized content management system there is a risk that the objects may be exposed to system infiltrators who may impermissibly access the objects. Recently, much work has been done to try to provide more secure storage and access of the objects.

In one approach, users could simply isolate their computers, with no access to any external networks (e.g., the Internet). However, with this approach, it may be difficult or costly to communicate with others outside the isolated environment. Further, there is a risk that someone in the isolated environment could simply copy data and load it onto other devices that are communicatively connected to external networks.

In another approach, users may encrypt the data before transmitting or storing it, potentially requiring decryption of the data in order to use it later. Many different techniques have been developed for such encryption and decryption. These techniques have, so far, prover cumbersome and difficult to implement and utilize.

As potential system infiltrators gain more knowledge of advancing technology (e.g., encryption techniques), techniques that are both more secure and easier to implement and utilize may be desirable for securing data.

SUMMARY OF THE DISCLOSURE

To those ends, among many others, systems and methods for a transparent encryption and decryption service (TEDS) that may be easily utilized in, or integrated with, a content system are disclosed. Embodiments of such systems and methods may be architected such they may be easily accessed and utilized with a wide variety of content systems, including those that are multi-tenanted, distributed, or fault-tolerant. Specifically, certain embodiments of a TEDS may reside architecturally between a content system and the content system's data store and be accessible by the content system to store or access content in the data store and encrypt or decrypt the content being stored or otherwise accessed.

In particular, embodiments disclosed herein provide systems, methods, and computer program products for enabling encryption and decryption of the content, by generating a data key that is specific to the content, encrypting the content with the data key, encrypting the data key with a tenant key associated with a tenant of the system, storing the encrypted content in an object store, and storing the encrypted data key, a tenant key identifier, and a storage record that includes information regarding the stored encrypted content, in a database. In some embodiments, the unencrypted data keys and unencrypted content are not transmitted over external networks.

In some embodiments, systems, methods, and computer program products provide for enabling encryption and decryption of the content, and replicating the stored encrypted content among multiple data centers. In some embodiments, an interface at a first data center encrypts the content, stores the encrypted content in a first object store, stores an entry for the encrypted content in a first data store, and places a message in a queue indicating that a storage event for the encrypted content has occurred, the message including an identifier associated with the encrypted content. A replication management module in the first data center accesses the message from the queue, obtains the entry for the encrypted content from the first data store, obtains the encrypted content from the first object store, and provides a request for replication of the encrypted content to a second replication management module located in a second data center. The request includes the encrypted content and information from the entry, for storage of the encrypted content in a second object store located in the second data center, without transmission of a decrypted version of the encrypted content, and without transmission of a decrypted version of a data key used to decrypt the encrypted content.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. In a content system (e.g., a content management system or collaborative content sharing system) that manages or stores content (e.g., electronic documents) there is often a need to implement a certain level of security. In particular, it is highly desirable to implement a level of encryption with respect to the content stored with respect to such systems. Such encryption may be especially desired in instances where the content system manages content from different unaffiliated entities or allows network access from public networks (e.g., the Internet).

In many cases, however, these content systems may not include provisioning for encryption of stored content or may encrypt content in an insecure manner. What is desired then, is an extensible architecture that can be easily integrated with existing content systems to provide encryption of content stored in association with those content systems.

To address those desires, among many others, systems and methods for a transparent encryption and decryption service (TEDS) that may be easily utilized in, or integrated with, a content system are disclosed. Embodiments of such systems and methods may be architected such they may be easily accessed and utilized with a wide variety of content systems, including those that are multi-tenanted, distributed, or fault-tolerant.

Specifically, certain embodiments of a TEDS may reside architecturally between a content system and the content system's data store and be accessible by the content system to store or access content in the data store and encrypt or decrypt the content being stored or otherwise accessed.

In a multi-tenant environment, embodiments of a TEDS may provide an interface to tenants of the content system (e.g., entities that may have multiple users or individual users, where individual users may be grouped under a generic "public" tenant) whereby tenants can be provisioned with a tenant specific key (e.g., each entity may have a unique key while the "public" tenant comprising many individual users may have a single key).

A content system interacting with tenants may access an interface provided by the TEDS to store or access content for those tenants (e.g., a GET, a POST, a DELETE, READ, STORE, WRITE, etc.) and provide the content and an identifier of the tenant requesting such access.

The TEDS system may encrypt the content and store the encrypted content. In particular, in certain embodiments, when a request to store the content is received by the TEDS system a data key may be generated to encrypt the content and the content may be encrypted with the generated key. The encrypted content can then be stored in the content system data store. Additionally, the data key may itself be encrypted with the tenant key corresponding to the requesting tenant (e.g., the tenant associated with a requesting user of the "public" tenant in the case of an individual user). The encrypted data key may then be stored in a data store associated with the TEDS such that it can be retrieved when the content is next accessed through TEDS (e.g., a subsequent GET or READ). Thus, for example, the content management system may not need to maintain keys used for encryption or decryption of content.

It will be noted that while certain embodiments of TEDS as disclosed herein may utilize a separate data store associated with TEDS to store the encrypted data key or other metadata associated with the content, in other embodiments the encrypted data key or metadata may be stored in the same data store as the content system data store in association with the encrypted content. Such embodiments may be utilized for example, when the content system data store allows user defined metadata to be stored when storing an object in the data stored. Atmos by EMC Corporation is an example of such a data store.

Figure 1:
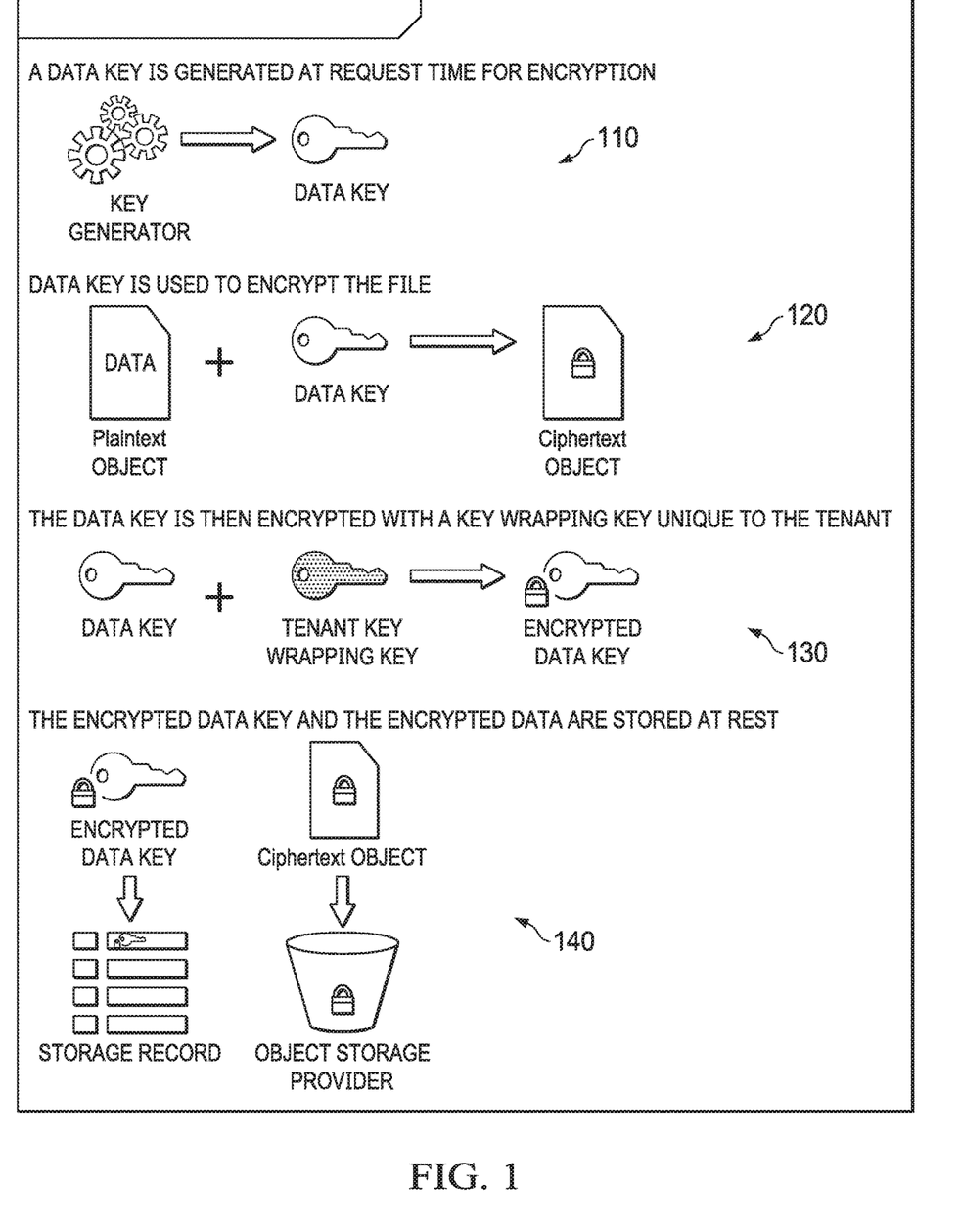
FIG. 1 is a block diagram depicting an overview of embodiments.

The encryption process according to one embodiment of TEDS is depicted in the block diagram of FIG. 1. At step 110 when content is stored by a requestor such as a content system a data key may be generated for encrypting that content. At step 120 the content (e.g., also referred to as the data or object) may be encrypted with the generated data key. This data key can then be encrypted, at step 130, with a tenant key for a tenant associated with a user who stored the content originally or associated with the instance of the content system that made a call to TEDS. The encrypted data key (EDK) and the encrypted content may then be stored at step 140. The encrypted object may be stored in a data store (e.g., also referred to as the object store or content system data store) associated with the calling content system while the encrypted data key may be stored in a data store associated with the TEDS. In particular, the EDK may be stored in a storage record such that it is associated with the metadata for the content, including, for example, where the encrypted content is stored in content data store.

In this manner, TEDS may be accessed by a requestor, including a content system or the like to encrypt stored content. As such, content systems may access TEDS to encrypt content generated externally (e.g., by users of the content system) or internally (e.g., used by the content system to manage externally generated content) such as versions, renditions, thumbnails, compressed versions of content, etc.

To further increase security of certain embodiments, TEDS may employ a Hardware Security Module (HSM) such as those made by SafeNet or Gemalto for secure storage and processing of tenant data keys. In particular, TEDS may interface with the HSM to generate a tenant key for a tenant and to encrypt/decrypt data keys used for content that are encrypted with a tenant key. Additionally, in certain embodiments TEDS may abstract the interface to the HSM through one or more services such that components of TEDS that are adapted to interface with the HSM may utilize the service to interface with the HSM. Thus, the tenant keys may never leave the HSM.

In certain deployments, certain content systems may be deployed or distributed in multiple locations (e.g., data centers) to ensure a level of fault tolerance or redundancy. TEDS may be adapted to operate in conjunction to ensure fault tolerance or redundancy by replicating encrypted content across multiple locations. In particular, TEDS may include a component responsible for congruency of stored content and associated metadata across the multiple locations, including the replication or deletion of content across the multiple locations.

In one embodiment, when content is stored or deleted at one location through TEDS an event message may be placed on a local queue indicating the type of event, an identifier for the content or other data associated with the content or metadata for that content. The replication component of TEDS may consume events off this queue and interact with a corresponding replication component of TEDS installed at another location, by sending a request with the type of event, the encrypted content or any metadata needed to the corresponding replication component. The replication component at the remote location may then store the received content or metadata or may delete the referenced content in the case of a delete. In this manner, content may be replicated across multiple locations. As an advantage, in many instances the content may be replicated without involvement of the content system itself, TEDS may provide the desired replication functionality.

Figure 2:
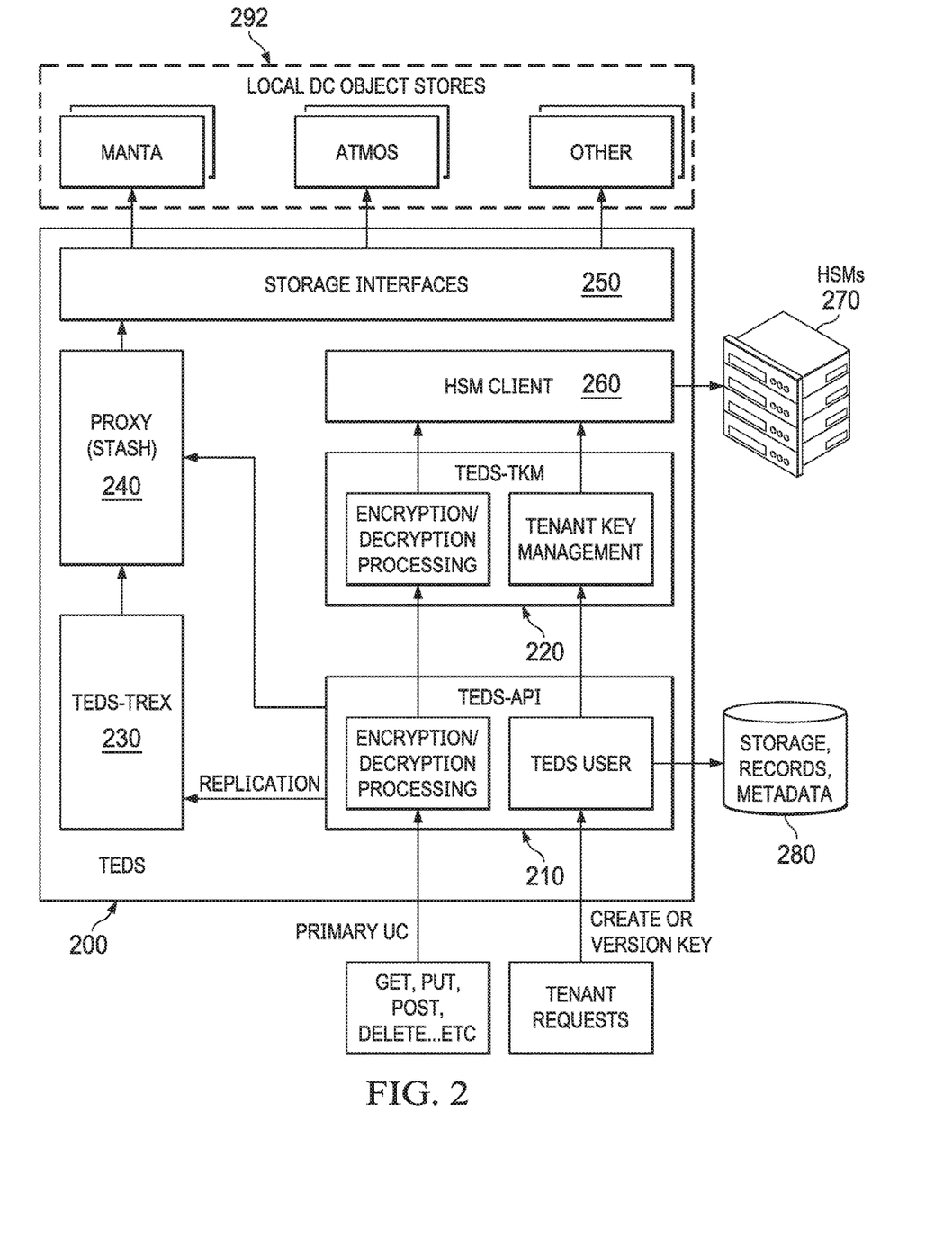
FIG. 2 is a block diagram depicting an architecture of one embodiment.

Referring now to FIG. 2, a block diagram of one embodiment of a TEDS is depicted. Here, TEDS 200 includes a TEDS-API module 210, a TEDS-TKM module 220, a TEDS-TREX module 230, a storage proxy (proxy) module 240, a storage interface module 250 and an HSM client module 260.

HSM client module 260 offers an interface (e.g., a Representational State Transfer (REST) interface, a Simple Object Access Protocol (SOAP) interface, an Application Programming Interface (API), etc.) through which the functionality of HSM 270 may be accessed. HSM 270 may be a Hardware Storage Manager such as a Luna HSM offered by SafeNet or the like and may be adapted to store keys and to encrypt data with those keys based on requests for encryption. The interface of the HSM client module 260 may abstract or standardize various interfaces offered by different types of HSMs such that different HSMs may be utilized as HSM 270 or that other components of TEDS 200 do not have to be changed when HSM 270 changes, etc.

TEDS-TKM 220 may offer an interface through which other modules may request encryption or decryption of keys or storage of tenant keys. TEDS-TKM 220 may interact with the HSM client module 260 to accomplish the requested operations and return a response through the interface.

TEDS-API 210 may offer an interface through which a user 290 (e.g., which may be a content system) may store or access content and an interface through which a user associated with a tenant may request a tenant key be provisioned (e.g., a new key for a tenant or a new version of a tenant key).

Storage proxy 240 offers an interface through which data stores 292 may be accessed. In particular, the interface of the storage proxy 240 module may abstract or standardize various interfaces offered by different storage interfaces 250 for different types of data stores such that different types of data stores 292 may be utilized as a data store 292, or that other components of TEDS 200 do not have to be changed when the type of data store 292 changes, etc. These data stores 292 may include, for example, Atmos by EMC Corporation, Manta by Joyent or another type of data store.

A request for a new key, or new version of a key, for a tenant may be received through the interface of the TEDS-API 210. Such a request may include, for example, an identifier associated with a tenant. Based on this request, TEDS-API 210 will generate a new tenant key (e.g. a 256-bit AES key in one embodiment) and a new tenant key identifier. The tenant key identifier may include an identifier associated with the tenant. In one embodiment, the tenant key identifier may include a tenant identifier and a version number (e.g., tenantid.1 for a first version of a tenant key, tenantid.2 for a second version, etc.).

TEDS-API module 210 can then store the tenant key identifier in association with the tenant identifier in the data store 280. Additionally, a request can then be made to TEDS-TKM module 220 to store the tenant key in association with the tenant key identifier. TEDS-TKM module 220 can then make a request to the HSM client 260 to store the tenant key identifier and the tenant key in the HSM 270. The HSM client 260 may then interface with the HSM 270 to store the tenant key and the tenant key identifier as a key value pair in the HSM 270. Thus, the tenant keys may never leave the HSM 270.

When a request for storage (e.g., a PUT, WRITE, STORE, CLOSE, POST, etc.) or encryption of content is received through interface at TEDS-API 210 the content may be obtained from the request, along with metadata associated with the content and an identifier for the tenant. The TEDS-API 210 can then generate a data key for that content and encrypt the content using the data key. In certain embodiments, the content may be encrypted using a data initialization vector (IV) specific for that content. The IV may be a 12-byte IV, or any other suitable length for encryption of content. As an example, the IV may be generated, for each upload, using a random generation technique and may be used to seed the encryption algorithm for encrypting the content. The encryption algorithm to be used may be selected by a user (e.g., prior to the encryption) or otherwise selected. Such encryption algorithms may include one or more of Advanced Encryption Standard (AES) 256, Galois/ Counter Mode (GCM), no padding, or any other suitable algorithm for encrypting content.

Additionally, TEDS-API 210 may generate a wrapping IV and send a request to TEDS-TKM 220 to encrypt the data key for that content. The request may include the wrapping IV, the tenant key identifier for that tenant, and the data key for the content. In some embodiments, the request may also include an identification of an encryption algorithm or a mode to use. For example, the encryption algorithm may be selected by a tenant, prior to encryption. The TEDS-TKM 220 may receive that request and use the interface provided by HSM client 260 to request HSM 270 to perform encryption on the data key according to the request parameters (e.g., using the wrapping IV, the data key, the tenant key identifier, the algorithm or mode, etc.).

In response to this request the TEDS-API 210 may receive an encrypted data key (EDK). This EDK may be the data key encrypted with the tenant key using the wrapping IV. The TEDS-API 210 can then store the encrypted content to the data store 292 through the storage proxy 240 and storage interfaces 250. TEDS-API 210 also stores an entry for the content in the data store 280. This entry may include a storage record for the content (e.g., an identifier for the content, metadata for the content, location of the content in data store 292, etc.) stored in association with the EDK for that content, any IVs (e.g., wrapping IV or data IV) used for that content, and the tenant key identifier for the tenant key used to encrypt the EDK, an identifier for an algorithm or mode utilized, or other data associated with the encryption of the content or the data key. Additionally, in some embodiments, TEDS-API 210 may place an event on a queue consumed by TEDS-TREX 230 to ensure that the encrypted content and associated entry in data store 280 gets replicated across other locations, as will be discussed in more detail.

Access to stored content may function similarly. In particular, when a request to access content (e.g., a GET, READ, OPEN, etc.) is received at TEDS-API 210, TEDS-API 210 may obtain an identifier of the content or a location of the content from the request. Using the identifier of the content or the requested location of the content the TEDS-API 210 may obtain the entry associated with the content from the data store 280. Again, this entry may include a storage record for the content (e.g., an identifier for the content, metadata for the content, location of the content in data store 292, etc.). The entry also includes the EDK for that content, any IVs (e.g., wrapping IV or data IV) used for that content, and the tenant key identifier for the tenant key used to encrypt the EDK, an identifier for an algorithm or mode utilized, or other data associated with the encryption of the content or the data key.

Based on the location of the content (e.g., as received or obtained from the obtained entry in the data store 280), the encrypted content may be retrieved from the data store 292 through the storage proxy 240 and storage interfaces 250. A request can also be sent to TEDS-TKM 220 to decrypt the data key for that content. The request may include the EDK, the wrapping IV used to encrypt that data key and the tenant key identifier for the tenant key used to encrypt the data key (e.g., as obtained from the entry in data store 280 associated with the content). In some embodiments, the request may also include an identification of an encryption algorithm or a mode to use (e.g., which may also be obtained from the entry in data store 280 associated with the content if utilized).

The TEDS-TKM 220 may receive that request and use the interface provided by HSM client 260 to request HSM 270 perform decryption on the received EDK according to the request parameters (e.g., using the wrapping IV, the tenant key identifier, the algorithm or mode, etc.). The decrypted data key is thus returned to the TEDS-API 210 through the HSM client 260 and TEDS-TKM module 220.

When the TEDS-API 210 receives the decrypted data key, the TEDS-API 210 decrypts the encrypted content with the data key (e.g., using a data IV as stored in the entry for the content in data store 280) and returns the decrypted content in response to the originally received access request.

Figure 3:
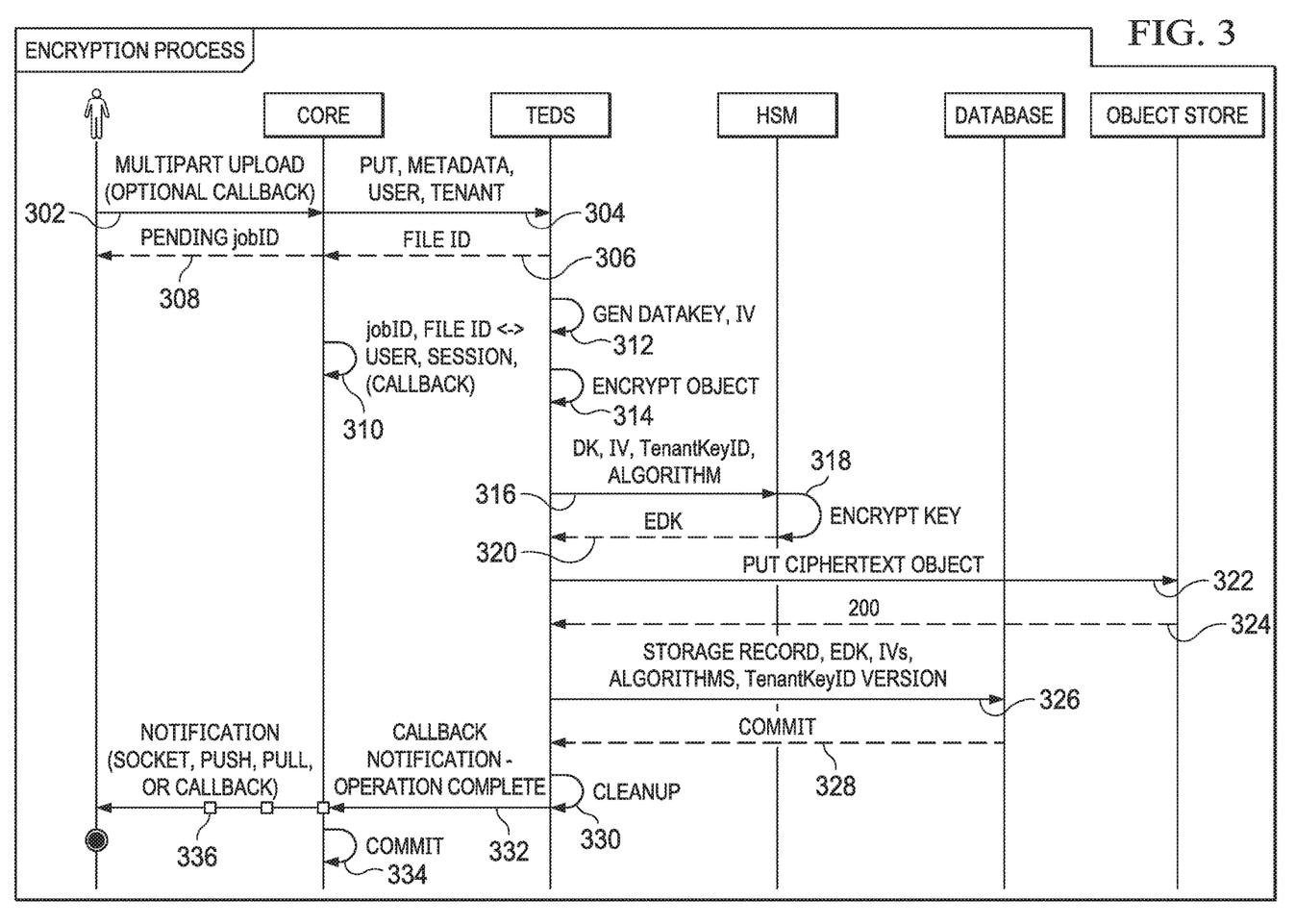
FIG. 3 is a flow diagram depicting a method implemented by an embodiment.
Figure 4:
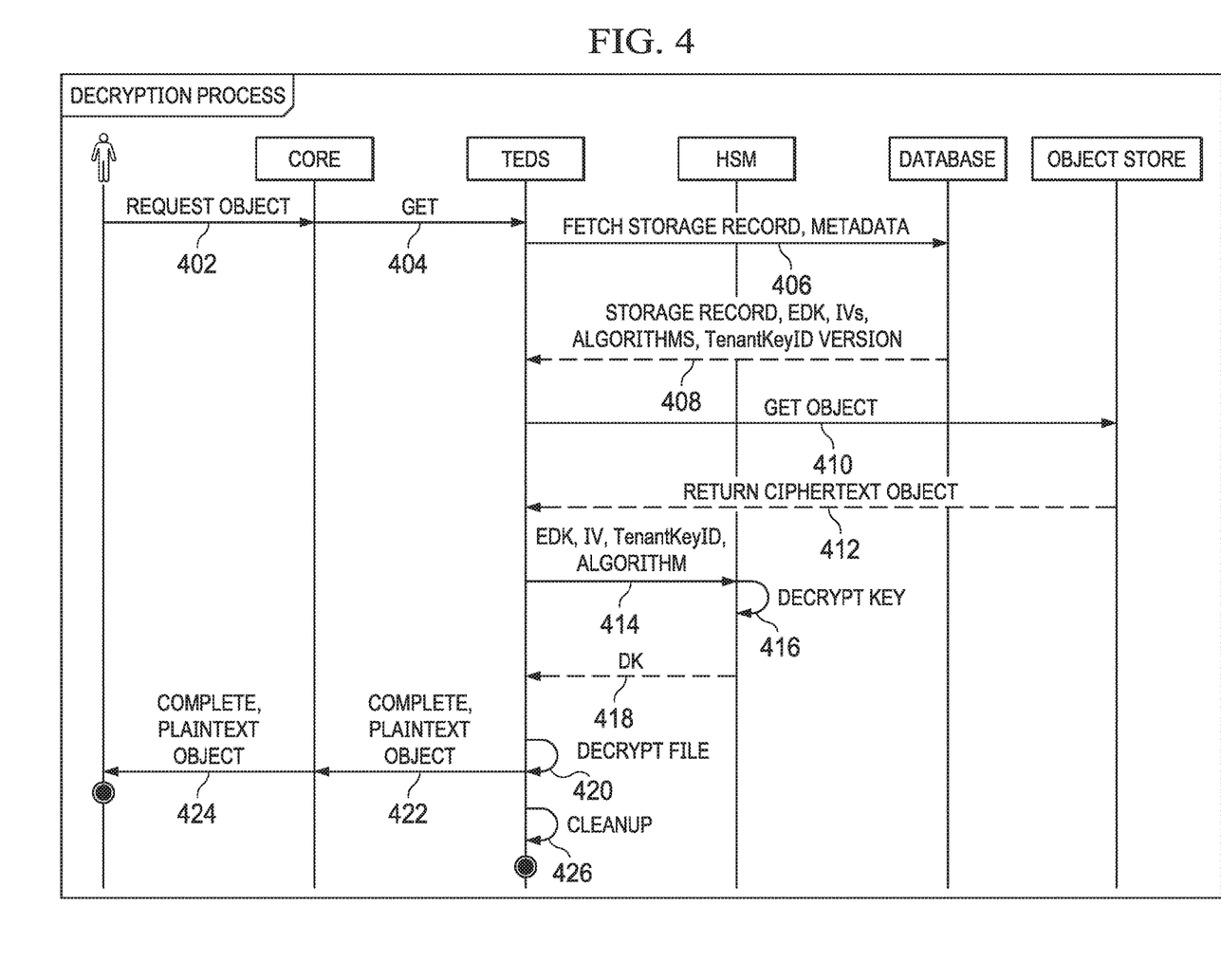
FIG. 4 is a flow diagram depicting a method implemented by an embodiment.

With the architecture of embodiments of TEDS in mind, attention is now directed to FIGS. 3 and 4 which depict, respectively, flow diagrams of embodiments of encrypting and decrypting content using an embodiment of TEDS (which may or may not be different than the embodiments of TEDS described herein). While in the depicted embodiments the CORE content system by OpenText Corporation is depicted as a user of the TEDS, it will be noted that other systems may be adapted to utilize TEDS and such other systems and uses of TEDS are contemplated herein without loss of generality.

Referring first to FIG. 3, at step 302 a user of a content system such as OpenText's Core may make a request (e.g., through a web based client or an application on the user's device associated with the content system, etc.) to the content system to store (e.g., upload) content. This request may include the content itself or the content may be sent subsequently to the request. The content system, at step 304 may make a corresponding storage request (e.g., a PUT, WRITE, STORE, CLOSE, POST, etc.) to TEDS to store the content. This request may include the content along with metadata associated with the content and an identifier for the tenant or the user.

In one embodiment, to facilitate the processing of the content system when this request is received by TEDS a file identifier (also known as a content identifier) for the content may be generated. This file identifier may include a unique alphanumeric designation associated with the file. In some embodiments, the file identifier may also include a location or path for the content. The file identifier can be returned at step 306 to the content system. The content system may generate a pending job identifier for the storage of the content and both send the job identifier to the requesting client at the user's device at step 308 and, at step 310, store the job identifier along with the file identifier and other data such as the user identifier or a session identifier at the content system. In this manner, the status of the initial request (e.g., the storage request) can be stored or obtained using this job identifier.

Then, at step 312, TEDS can generate a data key for that content and a wrapping IV, and encrypt the content using the data key at step 314. In certain embodiments, the content may be encrypted using a data initialization vector (IV) specific for that content. At step 316, TEDS can send a request to the HSM to encrypt the data key for that content. The request may include the wrapping IV, the tenant key identifier for that tenant, and the data key for the content. In some embodiments, the request may also include an identification of an encryption algorithm or a mode to use. The HSM may encrypt the data key with the appropriate tenant key identified by the tenant key identifier using the wrapping IV at step 318 and return the EDK to TEDS at step 320.

TEDS can then store the encrypted content to the data store associated with the content system at step 322. A return (e.g., an HTTP 200 status in cases where the storage request was made over HTTP) may be received by TEDS at step 324, indicating the encrypted content was stored by the data store. TEDS may also store an entry for the content in its data store at step 326. This entry may include a storage record for the content (e.g., an identifier for the content, metadata for the content, location of the content in data store 292, etc.) stored in association with the EDK for that content, any IVs (e.g., wrapping IV or data IV) used for that content, and the tenant key identifier for the tenant key used to encrypt the EDK, an identifier for an algorithm or mode utilized, or other data associated with the encryption of the content or the data key. A return from the data store may be received at step 328 indicating the storage of the entry was successful (e.g., the entry has been committed to storage).

Once the return from the data store is received at step 330, TEDS may perform any necessary cleanup, including the deletion of any keys or IVs from memory. It will be noted here that certain embodiments may have the advantage that keys (e.g., wrapping keys or data keys) are never stored on the data stores of the content system or TEDS in the clear. Thus, by only storing such keys in memory during generation or encryption, additional security may be achieved.

TEDS may also notify the content system that the requested storage operation is complete at step 332. The content system can notify the requesting client that the requested operation has been completed at step 336. Additionally, the content system may perform a commit at step 334 to note that the operation has completed successfully and the content has been stored.

Moving now to FIG. 4, at step 402 a user of a content system such as OpenText's Core may make a request (e.g., through a web based client or an application on the user's device associated with the content system, etc.) to the content system to access (e.g., retrieve, read, open, etc.) content (also referred to as an object or content object). The content system may, at step 404 send a request to access content (e.g., a GET, READ, OPEN, etc.) to TEDS. TEDS may obtain an identifier of the content or a location of the content from the request. Using the identifier of the content or the requested location of the content, TEDS may request the entry associated with the content from the data store at step 406 and receive the entry in response at step 408.

As mentioned, this entry may include a storage record for the content (e.g., an identifier for the content, metadata for the content, location of the content in data store 292, etc.). The entry also includes the EDK for that content, any IVs (e.g., wrapping IV or data IV) used for that content, and the tenant key identifier for the tenant key used to encrypt the EDK, an identifier for an algorithm or mode utilized, or other data associated with the encryption of the content or the data key.

Based on the location of the content (e.g., obtained from the retrieved entry in the data store), the encrypted content may be requested from the data store associated with the content system by TEDS at step 410. TEDS may receive the returned encrypted content at step 412. TEDS may also send a request to the HSM to decrypt the data key for that content at step 414. The request may include the EDK, the wrapping IV used to encrypt that data key and the tenant key identifier for the tenant key used to encrypt the data key (e.g., as obtained from the entry in the data store associated with the content). In some embodiments, the request may also include an identification of an encryption algorithm or a mode to use (e.g., which may also be obtained from the entry in data store associated with the content if utilized). The HSM may receive the request and perform decryption on the received EDK according to the request parameters at step 416 (e.g., using the wrapping IV, the tenant key identifier, the algorithm or mode, etc.). The decrypted data key is thus returned to TEDS at step 418.

When TEDS receives the decrypted data key, TEDS may decrypt the encrypted content with the data key at step 420 (e.g., using a data IV as stored in the entry for the content in data store) and returns the decrypted content in response to the originally received access request from the content system at step 422. The content system can then return the requested content to the user at step 424 (e.g., through the web based application or application installed at the user's device). TEDS may perform any necessary cleanup, including the deletion of any keys or IVs from memory at step 426.

As mentioned above, in many instances to insure redundancy or fault-tolerance installations of a content system may be replicated across multiple locations (e.g., in multiple data centers). In such instances, TEDS may be installed in each location and may serve to replicate content stored (and encrypted) at one location to one or more other locations, including the entry in the TEDS data store associated with the content. In particular, this replication may be done without decrypting the content or transporting any of the keys in the clear.

Figure 5:
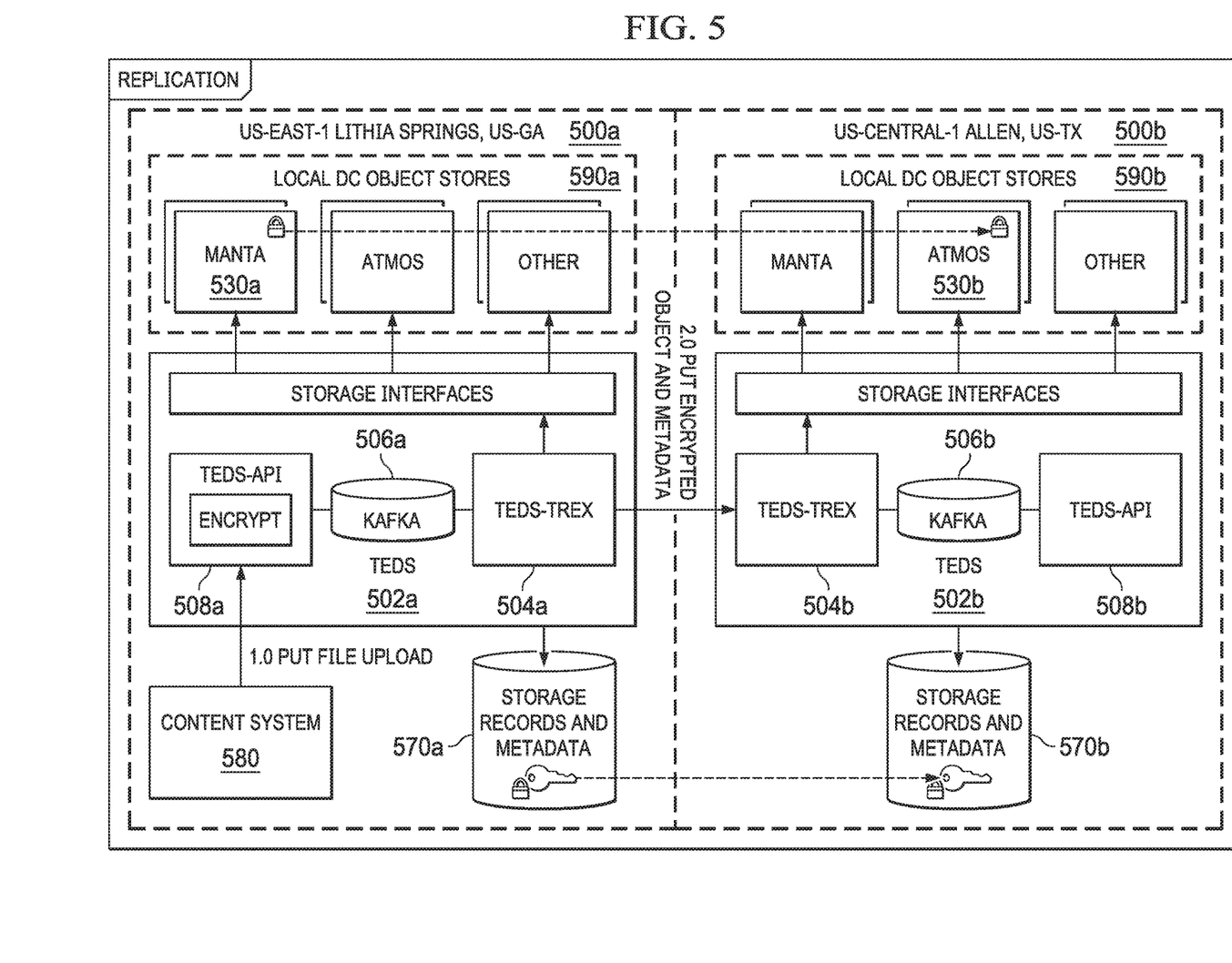
FIG. 5 is a block diagram depicting an architecture of one embodiment.

FIG. 5 depicts one embodiment of an architecture in which TEDS may replicate encrypted content and associated metadata across multiple locations. In the embodiments depicted there are two locations (e.g., data centers) 500. Each location may have a set of object stores 590 for storing content and may include an instance of TEDS 502. These locations may be deployed in different locations for a variety of reasons, including disparate regulations about where content may be stored (e.g. geographically), desire for fault tolerance or redundancy, or a variety of other reasons.

It may thus be desired to replicate content stored at one location 500*a* to another location 500*b*. However, as discussed above, content stored in association with TEDS is stored in an encrypted format. It is thus also desirable to replicate the content without having to decrypt or otherwise communicate the content or any keys in the clear. Each instance of TEDS 502 includes a TEDS-TREX module 504 and an associated queue 506 for facilitating such replication. TEDS-TREX 504 may offer an interface (e.g., a REST or SOAP interface or another type of web service, an API etc.) through which storage of content may be requested at the location 500. Queue 506 may include for example, an Apache Kafka queuing system with the TEDS-API module 508 and TEDS-TREX 504 as a publisher or consumer of messages on the queue 506. Based on the event obtained from the queue 506, TEDS-TREX 504 may also be adapted to issue requests to one or more TEDS-TREX modules 504 at other locations 500 to request replication of encrypted content.

Accordingly, when a user such as a content system 580 or the like stores content using at a particular location 500*a* the TEDS-API module 508*a* will encrypt the content and store the encrypted content 530*a* in the object store 590*a* at that location along with an entry for the content in the data store 570*a* (e.g., a storage record for the content, metadata for the content, location of the content in object store 590*a*, the EDK for that content, any IVs used for that content, the tenant key identifier for the tenant key used to encrypt the EDK, an identifier for an algorithm or mode utilized, or other data associated with the encryption of the content or the data key).

Additionally, TEDS-API 508*a* may place a message on the queue 506*a* indicating a storage event for the content has taken place and including an identifier associated with the content. This identifier may, for example, be the identifier of the content such that the entry in the data store 570*a* for the content may be obtained or the encrypted content 530*a* in the object store 590*a* obtained. TEDS-TREX 504*a* may receive or consume this event off of the queue 506*a* and obtain the entry in the data store 570*a* associated with the encrypted content 530*a* and the encrypted content 530*a* itself from the object store 590*a*.

Based on the event obtained from the queue 506*a*, TEDS-TREX 504*a* may access the interface offered by TEDS-TREX 504*b* to request replication of content and provide both the encrypted content and data from the entry in the data store 570*a* in the request. When TEDS-TREX 504*b* receives this request it may obtain the encrypted content and the entry data from the request and store the encrypted content 530*b* in its own local object store 590*b*, and entry in its own local data store 570*b*, respectively.

In this manner, encrypted content may be replicated across locations 500 without decrypting the content or keys associated with that content. Moreover, in certain embodiments this replication may be performed using TEDS-TREX modules 504 asynchronously to the operations of other modules of TEDS 502, allowing such replication to be accomplished without imposing a significant performance penalty on the operation of TEDS or users thereof. By replicating encrypted content in this manner along with the associated encrypted keys and IVs, etc., access to this encrypted content through these multiple locations 500 may be facilitated, thereby increasing redundancy, fault-tolerance, security or other advantages of such systems.

It will be noted that in order to ensure access to decrypted content from each location 500 the tenant keys may need to be accessible from the TEDS 502 at each location. Accordingly, an architecture may be implemented whereby an HSM may be accessible through TEDS 502 at multiple locations, or HSMs may themselves be replicated and accessible by TEDS 502 at each location.

Figure 6:
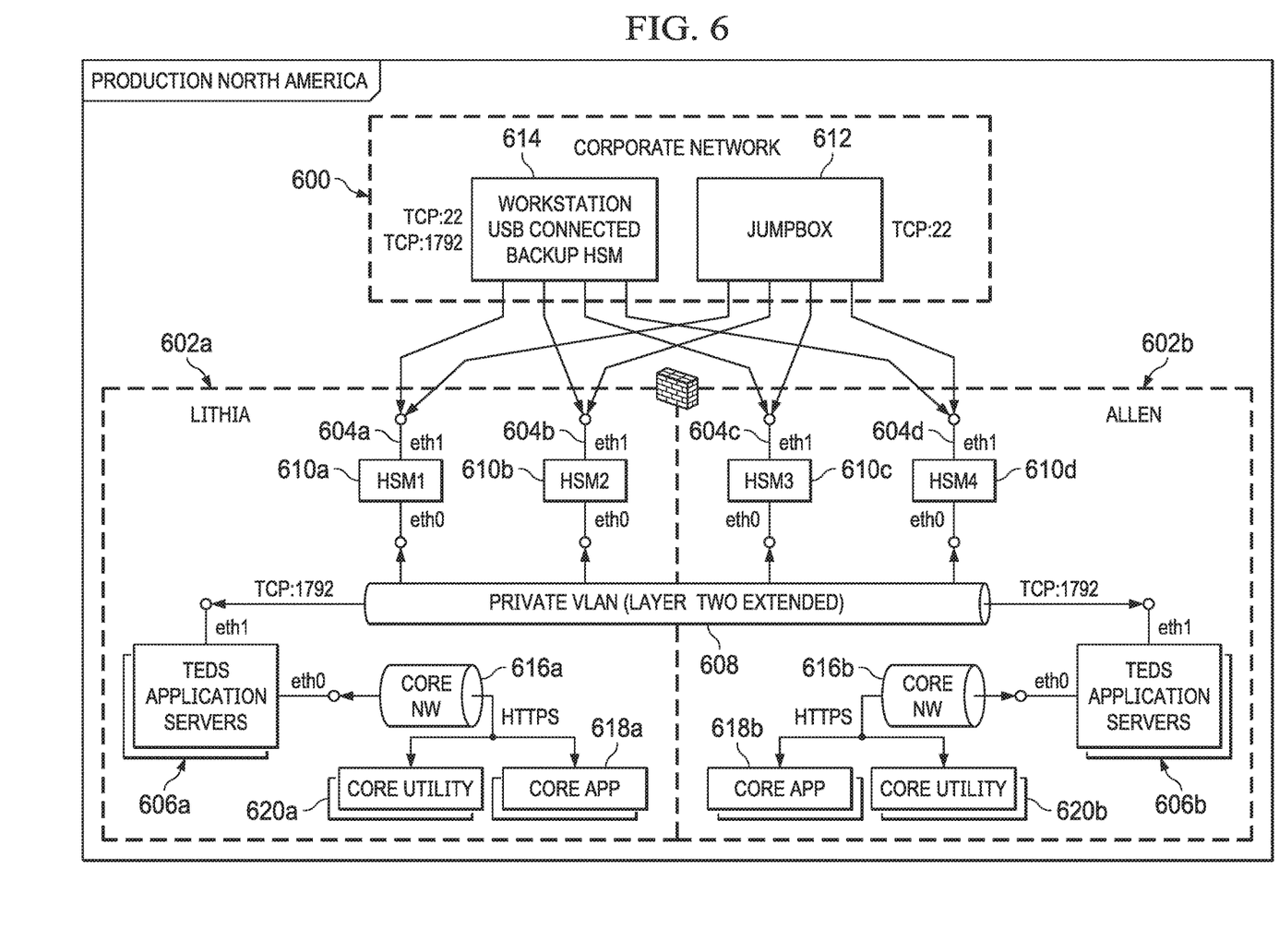
FIG. 6 is a block diagram depicting an architecture of one embodiment.

FIG. 6 depicts one embodiment of a network architecture for accessing HSMs by TEDS in multiple locations. In the embodiments depicted, there is a central network 600 (e.g., a corporate network) joining two locations 602 (e.g., data centers). Each location 602 may have one or more HSMs 604 communicating with TEDS servers 606 through a private network 608 (e.g., a private virtual LAN (VLAN) or the like). The private network 608 may provide network isolation of the HSMs 610 while allowing TEDS application servers 606 in each location 602 to communicate with one another, such that requests or responses may be communicated from one TEDS application server 606 to the other TEDS application server 606 (e.g., for replication or the like as discussed).

In particular, TEDS server 606 may have a communication interface (e.g., an Ethernet communication interface designated eth1) for coupling to the private network 608. Such a coupling may occur, for example over a TCP port (e.g., port 1792). HSMs 604 may also have a communication interface (e.g., an Ethernet communication interface designated eth0) for coupling to the private network 608.

TEDS servers 606 may have a second communication interface (e.g., an Ethernet communication interface designated eth0) for coupling to tenant network 616. Tenants 618, 620 and TEDS servers 606 may communicate over the tenant network 616 as discussed above to transmit requests and response or other data. As illustrated in this embodiment, the example tenants are applications and utilities according to OpenText's Core content management system but, as discussed, other types of tenants are possible and are contemplated herein. As shown in FIG. 6, communication over tenant network 616 may be via Hypertext Transfer Protocol Secure (HTTPS).

HSMs 610 may include a second communication interface (e.g., Ethernet interface eth1) to communicate with a workstation 614 and jumpbox 612. Workstation 614 or jumpbox 612 may provide a management or configuration interface through which the HSMs 604 (or their operation) may be configured. Jumpbox 612 may be a secure server adapted to allow secure communication across locations 602 such that HSMs 604 may be replicated across locations 602. A management interface may provide management via Secured Shell (SSH) (e.g., over TCP port 22). Additionally, the workstation 614 or jumpbox 612 may enable remote backup (e.g., of HSMs 604). For example, one or more designated workstations 614 may provide Universal Serial Bus (USB) connectivity of remote HSM backup units 614 via a TCP port (e.g., port 22 or 1792).

Figure 7:
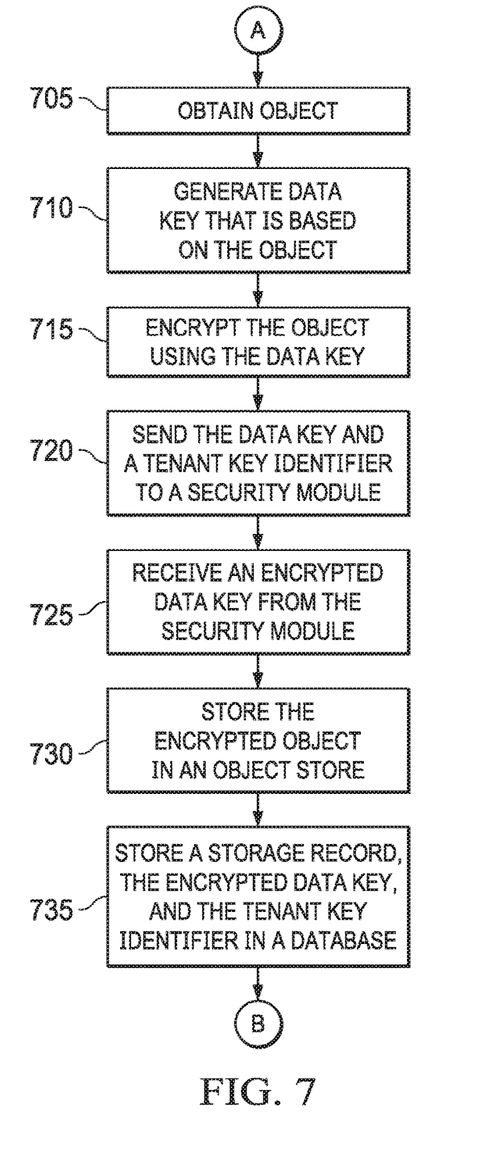
FIG. 7 depicts a flow chart illustrating one embodiment of a method for processing a request for storing objects.

FIG. 7 depicts a flow chart illustrating an example of a method for processing a request for storing objects according to some embodiments. Initially, at 705, an object may be obtained. For example, the object may be obtained by an object management module. At 710, a data key may be generated that is based on the obtained object. At step 715, the obtained object may be encrypted using the data key.

At step 720, the data key and a tenant key identifier may be sent to a security module. At step 725, an encrypted data key may be received from the security module. At step 730, the encrypted object may be stored in an object store. At step 735, a storage record, the encrypted data key, and the tenant key identifier may be stored in a database.

Figure 8:
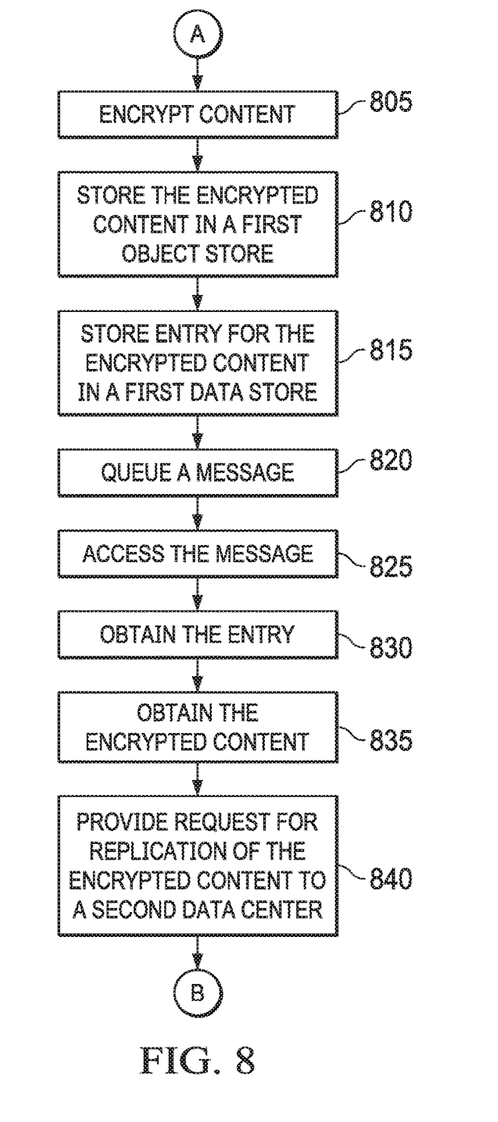
FIG. 8 depicts a flow chart illustrating one embodiment of a method for replicating tenant input information among multiple data centers.

FIG. 8 depicts a flow chart illustrating an example of a method for replicating tenant input information among multiple data centers according to some embodiments. Initially, at step 805, content may be encrypted. At step 810, the encrypted content may be stored in a first object store located at a first data center.

At step 815, an entry for the encrypted content may be stored in the first data store. At step 820, a message may be placed in a queue. For example, the message may indicate that a storage event for the encrypted content has occurred. The message may include an identifier associated with the encrypted content.

At step 825, the message may be accessed from the queue. For example, the message may be accessed by a replication management module located in the first data center. At step 830, the entry for the encrypted content may be obtained from the first data store. At step 835, the encrypted content may be obtained from the first object store. At step 840, a request for replication of the encrypted content may be provided to a second replication management module located in a second data center. For example, the request may include the encrypted content and information from the entry, for storage of the encrypted content in a second object store located in the second data center and storage of the information from the entry in a second data store located in the second data center, without transmission of a decrypted version of the encrypted content, and without transmission of a decrypted version of a data key used to decrypt the encrypted content.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A content management system, comprising:
   at least one device processor;
   an object store;
   a data store associated with an interface;
   a non-transitory computer readable medium, comprising instructions for:
   providing the interface that:
   obtains a request to store content in the content management system, the content management system at a first location;
   in response to the request to store the content, initiates encryption of the content, the encryption performed by generating a data key that is specific for the content, and encrypting the content using the generated data key, the encryption including generating an encrypted data key by encrypting the data key with a tenant key that is associated with a tenant;
   stores the encrypted content in the object store of the content management system;
   stores an entry for the encrypted content in the data store, the entry including a storage record that includes the encrypted data key; and
   generating, by the content management system, an event to initiate replication of the encrypted content at the content management system and the storage record by a second content management system at a second location without transmission of a decrypted version of the content and without transmission of a decrypted version of the data key, wherein, in response to receiving the event at the second content management system, the second content management system at the second location fetches the encrypted content as stored in the object store from the content management system and stores the same encrypted content at a second object store at the second location and each of the first and second content management system are adapted to decrypt the encrypted content with the data key.

2. The content management system of claim 1, wherein obtaining the request to store content includes obtaining the request to store content from a user associated with the tenant, wherein the tenant includes one of a plurality of tenants in a multi-tenant environment of the content management system.

3. The content management system of claim 1, wherein the interface obtains a request for generation of the tenant key, and initiates generation of the tenant key, wherein a security module generates the tenant key.

4. The content management system of claim 1, wherein a security module generates the encrypted data key by encrypting the data key with a tenant key that is associated with a tenant.

5. The content management system of claim 4, wherein the security module includes one or more hardware security modules (HSMs).

6. The content management system of claim 1, wherein generating the data key includes obtaining an initialization vector (IV) that is specific to the content.

7. A content management system, comprising:
   a processor; and
   a non-transitory computer readable medium, comprising instructions for:
   an object management module for:
   obtaining an object;
   generating a data key that is based on the obtained object;
   encrypting the obtained object using the data key;
   sending the data key and a tenant key identifier to a security module;
   receiving an encrypted data key from the security module;

initiating storage of the encrypted object in an object store of the content management system; and initiating storage, in a database, of a storage record, the encrypted data key, and the tenant key identifier; and generating an event for initiating replication of the encrypted object and the storage record by a second content management system at a second location without transmission of a decrypted version of the content and without transmission of a decrypted version of the data key, wherein, in response to receiving the event at the second content management system, the second content management system at the second location fetches the encrypted content as stored in the object store from the content management system and stores the same encrypted content at a second object store at the second location and each of the first and second content management system are adapted to decrypt the encrypted content with the data key.

8. The content management system of claim 7, wherein the security module includes a hardware security module (HSM).

9. The content management system of claim 7, wherein generating the data key includes obtaining an initialization vector (IV).

10. The content management system of claim 7, wherein generating the data key includes obtaining information indicating an encryption algorithm for encrypting the obtained object.

11. The content management system of claim 7, wherein the instructions are further for:

receiving a request for the object.

12. The content management system of claim 11, wherein the instructions are further for:

requesting the storage record from the database;
receiving the storage record, the encrypted data key, and the tenant key identifier from the database; and
receiving the encrypted object from the object store.

13. The content management system of claim 12, wherein the instructions are further for:

providing the encrypted data key, the tenant key identifier, and an identification of an encryption algorithm to the security module;
receiving the decrypted data key from the security module;
decrypting the received encrypted object; and
sending the decrypted object to a requestor of the object.

14. A method, comprising:

obtaining a request to store content in a content management system at a first location;

in response to the request to store the content, initiating encryption of the content, the encryption performed by generating a data key that is specific for the content, and encrypting the content using the generated data key, the encryption including generating an encrypted data key by encrypting the data key with a tenant key that is associated with a tenant;

storing the encrypted content at the content management system;

storing an entry for the encrypted content, the entry including a storage record that includes the encrypted data key; and generating an event for initiating replication of the encrypted content and the storage record by a second content management system at a second location without transmission of a decrypted version of the content and without transmission of a decrypted version of the data key, wherein, in response to receiving the event at the second content management system, the second content management system at the second location fetches the encrypted content as stored in the object store from the content management system and stores the same encrypted content at a second object store at the second location and each of the first and second content management system are adapted to decrypt the encrypted content with the data key.

15. The method of claim 14, wherein obtaining the request to store content includes obtaining the request to store content from a user associated with the tenant, wherein the tenant includes one of a plurality of tenants in a multi-tenant environment of the content management system.

16. The method of claim 14, further comprising obtaining a request for generation of the tenant key, and initiating generation of the tenant key, wherein a security module generates the tenant key.

17. The method of claim 14, wherein a security module generates the encrypted data key by encrypting the data key with a tenant key that is associated with a tenant.

18. The method of claim 17, wherein the security module includes one or more hardware security modules (HSMs).

19. The method of claim 14, wherein generating the data key includes obtaining an initialization vector (IV) that is specific to the content.

* * * * *